(12) United States Patent
Gerfast

(10) Patent No.: US 7,445,284 B2
(45) Date of Patent: Nov. 4, 2008

(54) IN-EXPENSIVE HEAD AND UPPER TORSO RESTRAINT WITH U-SHAPED AIR BAG

(76) Inventor: Sten R. Gerfast, 1802 Valley Curve, Mendota Heights, MN (US) 55118

( * ) Notice: Subject to any disclaimer, the term of this patent is extended or adjusted under 35 U.S.C. 154(b) by 0 days.

(21) Appl. No.: 11/732,816

(22) Filed: Apr. 5, 2007

(65) Prior Publication Data

US 2008/0246264 A1 Oct. 9, 2008

(51) Int. Cl.
- B60N 2/42 (2006.01)
- B60N 2/427 (2006.01)
- B60R 21/16 (2006.01)
- B60R 21/213 (2006.01)
- B60R 21/231 (2006.01)

(52) U.S. Cl. .................. 297/216.12; 297/216.13; 280/730.2

(58) Field of Classification Search ............ 297/216.12, 297/216.13; 280/730.2
See application file for complete search history.

(56) References Cited

U.S. PATENT DOCUMENTS

| | | | | |
|---|---|---|---|---|
| 3,510,150 A * | 5/1970 | Wilfert | ................ | 280/733 |
| 3,655,217 A * | 4/1972 | Johnson | ................ | 280/737 |
| 3,703,313 A * | 11/1972 | Schiesterl et al. | ............. | 297/391 |
| 3,753,576 A * | 8/1973 | Gorman | ................ | 280/730.1 |
| 3,838,870 A * | 10/1974 | Hug | ................ | 297/472 |
| 3,953,049 A * | 4/1976 | Surace et al. | ............. | 280/730.1 |
| 4,720,146 A * | 1/1988 | Mawbey et al. | ............. | 297/409 |
| 4,865,388 A * | 9/1989 | Nemoto | ................ | 297/403 |
| 4,946,191 A * | 8/1990 | Putsch | ................ | 280/730.2 |
| 5,330,255 A * | 7/1994 | Stawicki | ................ | 297/391 |
| 5,466,001 A * | 11/1995 | Gotomyo et al. | ............. | 280/730.1 |
| 5,496,061 A * | 3/1996 | Brown | ................ | 280/730.2 |
| 5,499,840 A * | 3/1996 | Nakano | ................ | 280/730.1 |
| 5,556,128 A * | 9/1996 | Sinnhuber et al. | ............. | 280/730.2 |
| 5,556,129 A * | 9/1996 | Coman et al. | ............. | 280/730.2 |
| 5,570,900 A * | 11/1996 | Brown | ................ | 280/729 |
| 5,615,909 A * | 4/1997 | Wipasuramonton et al. | ............. | 280/730.2 |
| 5,803,485 A * | 9/1998 | Acker et al. | ............. | 280/728.2 |
| 5,820,211 A * | 10/1998 | Heilig et al. | ............. | 297/216.12 |
| 5,833,312 A * | 11/1998 | Lenz | ................ | 297/216.13 |
| 5,836,648 A * | 11/1998 | Karschin et al. | ............. | 297/216.12 X |
| 5,911,433 A * | 6/1999 | Swann | ................ | 280/730.2 |
| 5,913,536 A * | 6/1999 | Brown | ................ | 280/730.2 |
| 5,934,750 A * | 8/1999 | Fohl | ................ | 297/216.12 |
| 6,030,036 A * | 2/2000 | Fohl | ................ | 297/216.14 |
| 6,033,018 A * | 3/2000 | Fohl | ................ | 297/216.13 |
| 6,045,181 A * | 4/2000 | Ikeda et al. | ............. | 297/216.12 |
| 6,065,810 A * | 5/2000 | Koenig et al. | ............. | 297/216.12 X |
| 6,135,561 A * | 10/2000 | Kruger et al. | ............. | 297/216.12 X |
| 6,155,598 A * | 12/2000 | Kutchey | ................ | 280/730.2 |
| 6,158,812 A * | 12/2000 | Bonke | ................ | 297/391 |
| 6,199,900 B1 * | 3/2001 | Zeigler | ................ | 280/735 |
| 6,331,014 B1 * | 12/2001 | Breed | ................ | 280/730.1 |
| 6,402,238 B1 * | 6/2002 | Bigi et al. | ............. | 297/216.12 |
| 6,425,602 B1 * | 7/2002 | Al-Amin et al. | ............. | 280/730.2 |
| 6,474,733 B1 * | 11/2002 | Heilig et al. | ............. | 297/216.12 |
| 6,474,734 B1 * | 11/2002 | Masuda et al. | ............. | 297/216.13 |

(Continued)

Primary Examiner—Rodney B. White

(57) ABSTRACT

A headrest and upper torso restraint relates to a vehicle seat having a pivoted head rest and a pivoted seat back that follows a human head and torso forward during the accident of the vehicle, but prevents backwards motion. A U-shaped air bag, the head rest, and seat back prevent whip-lash and also side-impact whip-lash by immobilizing the head and torso during a frontal or side impact crash.

18 Claims, 2 Drawing Sheets

U.S. PATENT DOCUMENTS

| | | | |
|---|---|---|---|
| 6,478,373 B1 * | 11/2002 | Hake et al. | 297/216.13 |
| 6,565,150 B2 * | 5/2003 | Fischer et al. | 297/216.12 |
| 6,568,754 B1 * | 5/2003 | Norton et al. | 297/216.12 |
| 6,572,137 B2 * | 6/2003 | Bossecker et al. | 280/730.1 |
| 6,575,494 B1 * | 6/2003 | Heilig et al. | 280/728.1 |
| 6,746,078 B2 * | 6/2004 | Breed | 297/216.12 |
| 6,749,256 B1 * | 6/2004 | Klier et al. | 297/216.12 |
| 6,779,840 B1 * | 8/2004 | Farquhar et al. | 297/216.12 |
| 6,802,562 B1 * | 10/2004 | Hake et al. | 297/216.12 |
| 6,805,404 B1 * | 10/2004 | Breed | 297/216.12 |
| 6,938,953 B2 * | 9/2005 | Håland et al. | 297/216.12 X |
| 6,942,292 B2 * | 9/2005 | Low et al. | 297/216.12 |
| 7,040,651 B2 * | 5/2006 | Bossecker et al. | 280/730.1 |
| 7,077,472 B2 * | 7/2006 | Steffens, Jr. | 297/216.12 |
| 7,150,468 B2 * | 12/2006 | Pan | 280/730.1 |
| 7,318,601 B2 * | 1/2008 | Sugimoto et al. | 280/730.1 |
| 2001/0009327 A1 * | 7/2001 | Zeigler | 280/735 |
| 2003/0122410 A1 * | 7/2003 | Fischer et al. | 297/216.12 |
| 2004/0075252 A1 * | 4/2004 | Pan | 280/730.1 |
| 2004/0113402 A1 * | 6/2004 | Bossecker et al. | 280/730.2 |
| 2005/0093349 A1 * | 5/2005 | Low et al. | 297/216.12 |
| 2006/0119150 A1 * | 6/2006 | Hoffmann | 297/216.12 |
| 2007/0085390 A1 * | 4/2007 | Kawashima et al. | 297/216.13 |

* cited by examiner

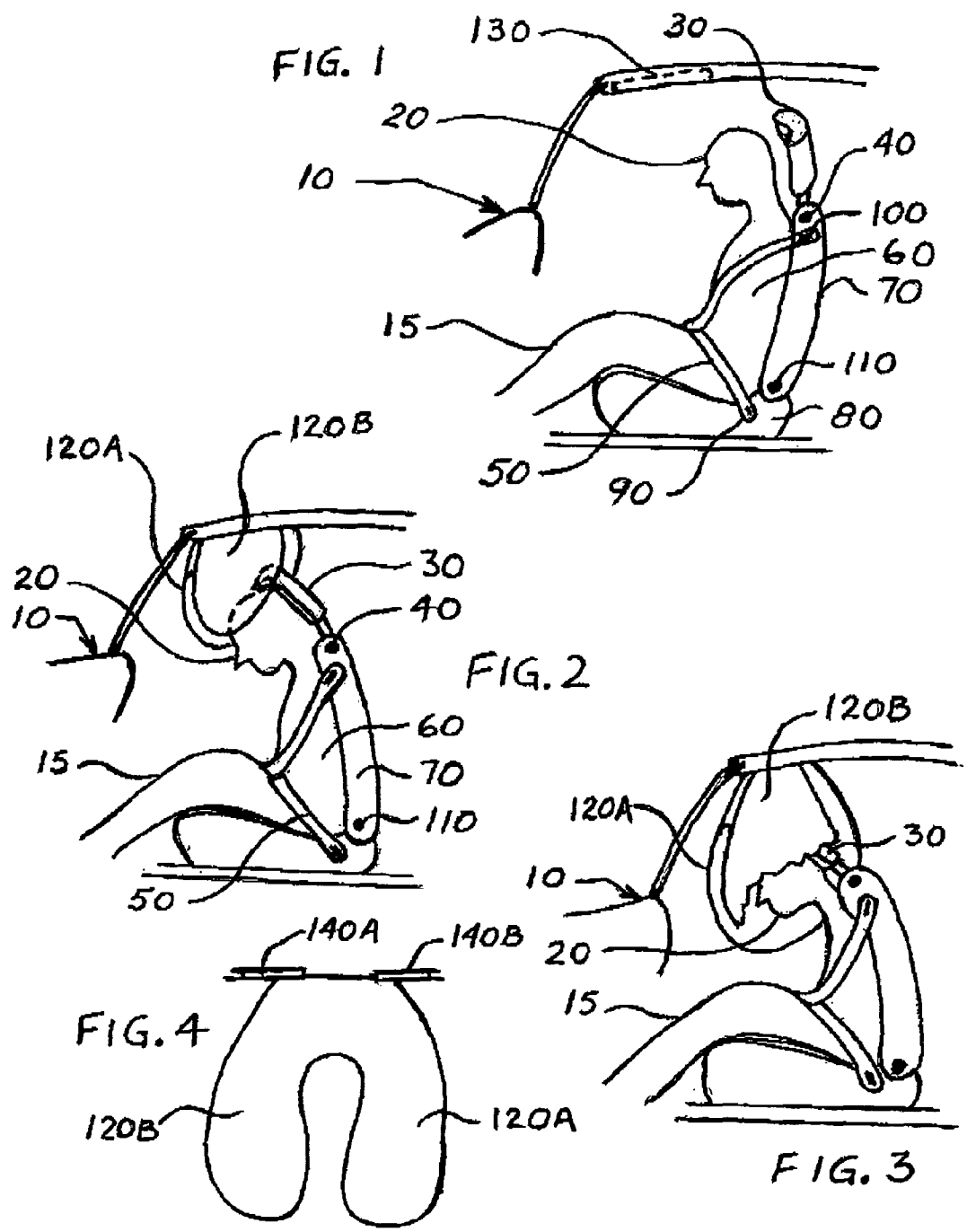

IN-EXPENSIVE HEAD AND UPPER TORSO RESTRAINT WITH U-SHAPED AIR BAG

BACKGROUND OF THE INVENTION

This invention concerns a head restraint for a human head and the upper torso of the human body that includes a single or a plurality of air bags. This invention, that basically contains 4 parts, is intended for mounting in a transportation vehicle to prevent head and body injuries as well as fatal injuries. More specifically, the head restraints, or head rest, are pivoted substantially in the area where the neck is. This pivoting is done in a one-way fashion using a ratchet assembly following the head forward, and immobilizing the head when the head is snapped forward in an accident. Similarly, the back rest is also pivoted in a one-way fashion, using a ratchet assembly, following the upper torso forward when its inertia is snapping it forward in an accident. At approximately the same instant a single U-shaped airbag, or a plurality of head-liner mounted airbags, is energized to meet and cradle the head, thereby immobilizing the head and torso preventing them from moving either further forward or further back in the first seconds of an accident. Release of head rest, back rest and seat belt are done during release of the seat belt.

DESCRIPTION OF RELATED ART

Dash board mounted air bags are commonly used in vehicles today. Inertia of the head and upper body rapidly moves both the head and body forward in an accident. When the airbags, as used today, are energized they violently push the forward-moving head backwards towards the stationary head rest and seats back violently snapping the head and neck. This snapping of the head, neck and collar bone has in the past caused severe injuries and even deaths. The same is true with the commonly used steering wheel mounted air bags. When energized they also violently push the forward-moving head and body backwards towards the stationary headrest and the stationary seat back causing severe injuries. Some deaths have also occurred from the above mentioned severe snap back, sometimes referred to as "whip lash". So called side-airbags are also installed in vehicles today to prevent injuries when a car is hit from the side by a second vehicle. The impact from this type of collision causes the inertia of a drivers or passengers head to be forced in towards and against a side wall in the first car. When the side airbag is exploding it reverses the direction of head motion towards the inside of the car, again violently snapping the head towards the inside of the car were there is presently no protection. U.S. Pat. No. 7,152,873 has an airbag attached in the wind shield area but no protection for the above stated snap-back. U.S. Pat. No. 5,540,459 is a side airbag with its force directed towards the inside of the car with presently no protection to prevent the above snap-back. U.S. Pat. No. 5,362,097 is trying to do a slightly more "downwardly" force, but there is still a violent force trying to push the head towards the shoulder (on the inside side of the car) of the driver or passenger, probably twisting the neck pretty severely. A much more safe construction would have the head protected on both sides, The safest solution is to substantially immobilize the head for a few seconds during and after the accident. Of course without the dashboard mounted airbags, the steering wheel mounted airbags, side mounted airbags or seat belts, many more deaths and severe injuries were occurring in the past without them. But this invention is intended to take care of the shortcomings of today's airbags that are used in the vehicles today, and further minimize both injuries to the head, the neck, the collarbone and the upper torso of the body.

SUMMARY OF THE INVENTION

The first object of this invention is to substantially immobilize the head with a pivoted V-shaped head rest, a pivoting seat back and a U-shaped airbag. Together with the standard seat belt it prevent injuries to the head, neck, collar bone and the upper torso of the body. This invention accomplish this with some simple and inexpensive pivots and ratchet assemblies together with an air bag or airbags mounted either in the head-liner of the vehicle or in similar mounting places suitable for containment of a collapsed airbag.

Preventing head and neck injuries is done with pivoting the head rest substantially in the area where the neck is. Pivoting the head rest on an axle that also contains a ratchet assembly is allowing the headrest to move forward, but preventing the same headrest from moving backwards in an accident. The forward motion naturally occurs when the vehicle is involved in an accident, and the vehicle suddenly stops. The inertia of the headrest makes it pivot on its axle, swings forward and is retained in its forward position. This head rest follows the head that is also swinging forward by inertia, thereby cradling and immobilizing the head. An alternate way of making the head rest swing forward, at the instant of an accident, would be to use a pyrotechnic cartridge similar to the one's used in today's airbags. Seat belt use, that is the requirements in all states, would be followed in this invention, preferably with a lap and shoulder belt. The lap and shoulder belt, that restrains the upper torso, should in this invention, be anchored and latched in the back rest assembly that is also restraining the upper torso to the back rest.

In addition to the pivoting of the head rest described above, a secondary pivoting is done on the back rest.

This pivoting is substantially located in the area where the lower back is, hinging and pivoting the back rest on an axle that also contains a ratchet assembly. This is allowing the back rest to move forward, but preventing the same back rest from moving backwards.

The upper torso, that is strapped in by the seat belt, will follow the forward motion of the back rest.

The forward motion of both the torso and the seat back naturally occurs when the vehicle is involved in an accident, and the vehicle suddenly stops. The inertia of the back rest makes it pivot on its axle, swings forward and then is retaining its forward position. The forward motion can be limited to 25 degrees from its original position.

An alternate way of making the back rest swing forward, at the instant of an accident, would be to use a pyro-technic cartridge similar to the ones used in today's airbags. The term forward is used to mean the motion towards the front of the vehicle.

The double pivoting that is used in head rest and seat back is helpful to conform to a persons body and head.

It would be advantageous to have the inertia of the headrest somewhat similar to the weight and inertia of an average human head, and the inertia of the back rest to approximate the weight and inertia of the average upper torso of a human body.

This inertia equivalence can be accomplished in today's stamped steel seat backs and head rests, that also contains heavy foam padding and leather or cloth covering. The ratcheting two assemblies can also be accomplished by stamped steel "one way notches" in the area of the pivoting axles. After an accident the forward leaning seats back and head rest can be restored to their normal upright position with a simple resetting of the ratchet assemblies.

This resetting is fast and easily done by un-buckling the seat belt.

The conditions for these two assemblies to swing forward would be to have a mechanical preset condition limited to, for example, a collision at 10 or 15 miles per hour. Or swung forward by a pyro-technic device designed to operate at a preset level by a micro controller such as 25 miles per hour. Their normal upright position is assured by either a frictional or mechanical device. This invention can be described as a four part immobilizing restraint for a human head and upper torso comprising:

a V-shaped head rest pivoting solely forward,
connected with a pivot to a seat back in a vehicle, said seat back also pivoting solely forward,
a seat belt anchored and latched to said seat back securely restraining said head and upper torso,
on the left and right side of said head a rapidly deployable U-shaped airbag,
said four parts providing an immobilizing cradle for both the inertia-moving said head and upper torso,
moving together in unison with the inertia of said head rest and said seat back,
during the first seconds of a front or side impact collision of said vehicle.

This invention can also be described as an in-expensive head and upper torso restraint having a head-liner mounted air bag comprising:

vehicular seat backs and head rests mechanically arranged to follow the forward motion of a human head and upper torso, but preventing the snap-back of said head and torso in a vehicular frontal or sideways collision, seat belts attached and anchored in said seat backs,
a U-shaped air bag contained in a cavity in the head liner of said vehicle,
said seat belts and said airbag mounted around each said seat back,
pyro-technic cartridges rapidly actuating said air bag when said collisions occur.

This invention can also be described as an in-expensive head and upper torso restraint having a head-liner mounted air bag comprising:

vehicular seat backs and head rests mechanically pivoted with ratchets to follow the forward motion of a human head and upper torso, but preventing the snap-back of said head and torso in a vehicular frontal or sideways collision, seat belts attached and anchored in said seat backs,
a rapidly deployable air bag or air bags contained in cavities in the head liner of said vehicle,
said head rest, said seat belt and said airbag or airbags mounted around each said seat back,
providing substantially head and upper torso immobilization for persons seated in said seat backs when said collision occurs.

In summary, the above language is describing how this invention is preventing the head as well as the upper torso of the body from snapping back after an accident of the vehicle. This is contrary to what presently happens when a vehicle commonly equipped with one or two air bags that are exploding and pushing back on the head and human body into a fixed backrest and fixed head rest. In the present invention the cradling of the head, or head immobilization, should minimize the injuries to the head, neck, and collar bone and also save lives.

As mentioned above the forward motion of the head and torso that naturally occurs when the vehicle is suddenly stopped, and the prevention from "snap-back", is a further object of the present invention in providing a method of further cradling the head and torso with a U-shaped airbag. This airbag is located on both sides of the head providing support in a frontal collision and even more important support in a side-collision.

It could take the form of a left side and a right side bag connected through a pneumatic tube requiring only a single cartridge. It could also take the form of two V-shaped air bags located in the head-liner of the vehicle.

The term head-liner is meant to describe the thick sound-absorbing lining in the ceiling of a vehicle.

At approximately the time of the impact, either a single or a plurality of head-lining mounted airbags are energized to meet and cradle the forward swinging head and torso preventing them from moving either further forward or further back in the first seconds of an accident. By preventing them from either moving forward or backwards, they substantially are immobilizing both the head and upper body until the exploding airbags start to collapse after a few seconds.

The head rest, the seat back, the seat belt, a U-shaped air bag can be described as a 4 part immobilizing cradle for the head and upper torso during the first seconds of a front or side-impact collision of a vehicle.

This air bag can of course also be mounted in a conventional positions, such as steering wheel or dash, in the vehicle, but if dual, the preferred locations of these air bags are in two cavities in the headliner.

The two cavities are preferably mounted in an open-V-shape that would guide the head into the narrow part of the V-shape cradling the head and torso. The "open" V-shape will allow a person to have limited sight forward even during the activation and engagement of the two air bags. A sun-visor construction with two separate visors and hinges can be around said V-shape. If the car would be equipped with a sun roof, one mount could be done around the latch handle for the roof.

In addition, the open V-shape prevents eye injuries from a persons eye glasses being forced into the nose and eyes, that sometimes occurs with present front mounted airbags. It could also prevent blinding the occupants that has occurred in the past.

The two cavities, located basically in the head liner of the vehicle, can be filled with the folded air bags in a box-like construction form-fitted to the cavities. The forward portion on these boxlike constructions can be hinged in their edge with a cushioned lid swinging forward, or to the side, to open, exposing and allowing the folded air bags to inflate. The box-like parts can have clearance all around the cavities that makes it un-necessary to explode and damage very expensive cosmetic parts. This makes the present invention and construction much less expensive, as well as re-loadable at low cost.

Furthermore, this invention eliminates: 1, a common steering wheel airbag, or alternatively 2 a common dash board mounted airbag, 3 a common left side-curtain air bag, 4 the common very expensive restorative parts that are a necessity for these two eliminated airbags. The common left side-curtain air bag is replaced by this inventions left side U-shaped airbag mounted in the head-liner.

With this construction it is not necessary to explode one or two cosmetic plastic covers as is common in today's automobiles. The exploding cosmetic dash board covering and the cosmetic plastic covering on the steering wheel are very expensive to replace. The whole dash board and full steering wheel assembly is sometimes replaced. Some insurance companies even do determine, that when both air bags have exploded the car is a total loss. With the present inventions the specific cavity and boxlike construction makes it un-necessary to cosmetically hide the air bags in the head-liner, thereby providing a less expensive solution. This also has the advantage of an easy and inexpensive air bag replacement. The V-shaped air bags in this invention also protect the head from moving sideways when the vehicle is hit from the side. When the computer is sensing a side impact, that also retards the vehicles forward motion, it is triggering and igniting the pyro-technic devices and instantly is cradling the head.

The two V-shaped airbags can also be combined to be formed like a single U-shape, further cradling the head and also preventing the head from advancing too far forward during a very severe accident.

This U-shaped airbag is advantageously inflated with one cartridge.

With the present invention in place it is likely that the cost of air bag protection is cut in half, and because of the substantially immobilized head and upper torso with its four components, the injuries or deaths sustained are minimized in either a front impact or side-impact collision.

BRIEF DESCRIPTION OF THE DRAWINGS

FIG. 1 is showing a safety dummy 15 seated normally in the driver position in a vehicle 10 with both doors and panels removed.

FIG. 2 is showing a safety dummy 15 seated in the driver position in a vehicle 10 after onset of impact.

FIG. 3 is showing a safety dummy 15 seated in the driver position in a vehicle 10 a fraction of a second later.

FIG. 4 is the front view of a possible shape of an air bag, V-shaped or U-shaped like in 120 A and 120 B.

DETAILED DESCRIPTION OF THE DRAWINGS

Figure 5:
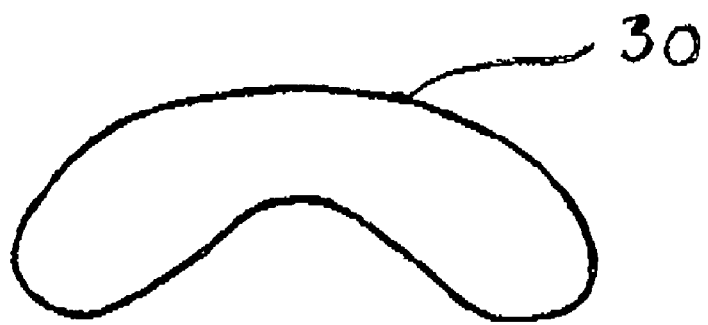
FIG. 5 is a top view of the V-shaped headrest.

FIG. 1 is showing a safety dummy 15 seated normally in the driver position in a vehicle 10 with the head 20 in a normal upright position. A V-shaped head rest 30, pivoted at 40, also in its normal upright position, is located behind head 20. A lap and shoulder safety seat belt 50 is securely restraining the dummy's torso 60 to the seat back 70. The torso 60 is in a normal upright position. The seat belt 50 is attached at the seat 80 at point 90 and at shoulder point 100. Seat back 70 is pivoted at point 110. The seat belt's latching point behind the dummy's body is not shown. The vehicles head liner 130 is shown with possible cavities in the head liner for the folded airbag 120 A and 120 B.

In FIG. 2 is showing a safety dummy 15 seated in the driver position in a vehicle 10 after onset of impact. The forward inertial motion of the dummy's head 20 and the forward inertial motion of upper torso 60 are shown at the onset of impact when the vehicle 10 has a frontal or side impact accident. The force of a side impact also retards the forward motion of the vehicle to affect the forward inertia of the head 20 and torso 60.

It is also showing how the pivoted 110 seat back 70 with its inertia has moved in unison with the torso 60. The seat back 70 is hugging the back part of the torso 60. The seat back 70 has a pivot point at 110. Also shown is how the impact has moved V-shaped head rest 30 forward by inertia to cradle the head 20. V-shaped head rest 30 is pivoted at point 40. In FIG. 2 the air bag is shown as two sections 120 A and 120 B. Deployment of this airbag 120 A and 120 B has started to further envelope downward and cradle the head 20. The seat belt 50 is still securing the torso 60 to seat back 70.

In FIG. 3 is showing a safety dummy 15 seated in the driver position in a vehicle 10 a fraction of a second later than FIG. 2. The air bag 120A and 120 B has further deployed downward with 120 A preventing the head 20 from being pushed into the interior of the vehicle. This prevents "sideway whiplash".

It is also showing how the deployment is now more complete, with the immobilization of the head 20 accomplished between air bag 120A and 120 B, and the V-shaped head rest 30.

The air bag's right side 120 A is on the right side of dummy head 20 and the air bag's left side 120 B is partially sectioned to show the cradling of the dummy head 20.

FIG. 4 is a front view of a possible shape of airbag 120 A and 120 B with pneumatic connection between the A and B part for a less expensive design using only one pyro-technic cartridge. Fastening points are shown at 140 A and 140 B.

This U-shape or saddle shape is both helpful in the immobilization of the head 20 and also allows some vision forward during the accidents critical moments when it is important to try to avoid a secondary collisions. Its shape is also preventing eye damage and eye glass damage.

The illustrated details does not preclude that other different shapes can not easily be constructed.

The airbag 120 can of course be placed in other places of the vehicle.

Photos of crash testing to further clarify the drawings are submitted for information only.

The invention claimed is:

1. A four part immobilizing restraint for a human head and upper torso comprising:
    a) a V-shaped vehicular head rest,
    b) connected with a pivot and ratchet assembly to a seat back in a vehicle, said pivot and ratchet assembly allowing only forward pivotal movement during an collision; said seat back also forwardly pivoting and ratcheting via a pivot and ratchet assembly during an collision,
    c.) a seat belt anchored and latched to said seat back for securely restraining said head, and upper torso,
    d.) a rapidly deployable U-shaped airbag adapted to be contained in a head liner of a vehicle and deployed on left and right sides of the head of a person seated in said seat back, with said head rest, said seat back, said seat belt and said air bag providing an immobilizing cradle for any inertia responsive forward, backward, or sideways movement of said head and upper torso when moving together in unison with the inertia of said head rest and said seat back during the first seconds of a front or side impact collision of said vehicle.

2. A restraint according to claim 1 wherein said pivoting forward motion is limited to 25 degrees.

3. A restraint according to claim 1 wherein said head rest and said seat back are free to move backwards after release of said seat belt.

4. A restraint according to claim 1 wherein said head rest is pivotal and has a ratchet assembly, and said seat back is pivotal and has a ratchet assembly, said ratchet assemblies allowing said head rest and said seat back to move forward separately or move forward together.

5. A restraint according to claim 4 wherein said headrest and seat back pivotal movements are actuated by a pyro-technic cartridge.

6. An inexpensive head and upper torso restraint system having a head-liner mounted air bag comprising one or more vehicle seats, said vehicle seats including:

each of said vehicle seats having vehicular seat backs and head rests both mechanically ratcheted to follow forward motion of a human head and upper torso, but preventing snap-back of said head and torso during a vehicular frontal or side collision;

seat belts attached and anchored in each of said seat backs;

a U-shaped air bag adapted to be contained in a cavity in a head liner of a vehicle;

said seat belts and said air bag mounted around each said seat back;

and pyro-technic cartridges rapidly actuating said air bags when a collision occurs.

7. A restraint according to claim 6 wherein each said airbag, each said head rest, and each said seat belt cradles and immobilizes said head during the first seconds of a collision.

8. A restraint according to claim 7 wherein a side collision retards the forward vehicle speed at least 10 miles per hour with said retardation actuating said cartridge.

9. A restraint according to claim 6 wherein said cartridge actuation occurs at impact when the vehicle speed is above 18 miles per hour.

10. A restraint according to claim 6 wherein each said U-shaped airbag has a center section, each said U-shaped airbag allows sight through the center section of said U, and said center section avoids hitting eye glasses worn by a person seated in each said seat back.

11. A restraint according to claim 6 wherein the use of one or more U-shaped head-liner mounted air bags is less expensive than using two standard dashboard mounted airbags.

12. An inexpensive head and upper torso restraint system having head-liner mounted air bags comprising one or more vehicle seats, said vehicle seats including:

vehicular seat backs and head rests both mechanically pivoted with ratchets to follow forward motion of a human head and upper torso, but preventing snap-back of said head and torso in a vehicular frontal or side collision;

seat belts attached and anchored in each of said seat backs;

one or more rapidly deployable U-shaped airbags adapted to be contained in cavities in a head liner of a vehicle;

said head rest, said seat belt, and said airbags around each said seat back providing head and upper torso immobilization for persons seated in said seat backs when a collision occurs.

13. A restraint according to claim 12 wherein said one or more head-liner mounted airbags are positioned as an opened V around the head of a person seated in a seat back of said vehicle seats.

14. A restraint according to claim 12 wherein said one or more head-liner mounted airbags are positioned as an opened V around the head of a person seated in the seat back of the vehicle seat, the head-liner mounted airbags mounted in cavities above front seats of the vehicle are mounted adjacent to the front wind-shield.

15. A restraint according to claim 12 wherein said one or more airbags are connected pneumatically, each forming a substantially U-shaped airbag inflated by a single pyro-technic cartridge.

16. A restraint according to claim 12 wherein said airbags are actuated by one or more pyro-technic cartridges that in turn are actuated by a micro-controller.

17. A restraint according to claim 12 wherein said airbags are cradling said head on both sides preventing sideways snap-back during a side collision as well as preventing front to back during a frontal collision.

18. A restraint according to claim 12 wherein said cavities make it unnecessary to cosmetically hide said airbags.

* * * * *